United States Patent
Zurek

[15] 3,669,194
[45] June 13, 1972

[54] SIDE SHIFTING IMPLEMENT APPARATUS

[72] Inventor: James W. Zurek, Lombard, Ill.

[73] Assignee: International Harvester Company, Chicago, Ill.

[22] Filed: Jan. 22, 1970

[21] Appl. No.: 5,067

[52] U.S. Cl. .............................. 172/280, 56/15.4, 56/15.5, 37/42, 280/419
[51] Int. Cl. .................................................. A01b 69/08
[58] Field of Search .............................. 172/278–281, 305, 172/306, 804, 805; 280/467, 419, 442; 180/12; 37/42; 56/7, 15.4, 15.5

[56] References Cited

UNITED STATES PATENTS

| | | | |
|---|---|---|---|
| 2,980,443 | 4/1961 | Fina | 172/279 |
| 2,328,064 | 8/1943 | Doty | 172/279 |
| 2,341,181 | 2/1944 | Johnson | 172/279 |
| 2,099,902 | 11/1937 | Moyer et al | 56/7 |
| 2,199,674 | 5/1940 | Ronning | 172/281 |
| 2,341,824 | 2/1944 | Smith | 172/279 |
| 2,662,458 | 12/1953 | Ermey | 172/279 |
| 3,010,230 | 11/1961 | Zubko | 172/280 |
| 3,429,109 | 2/1969 | Heth et al | 56/7 |
| 2,595,023 | 4/1952 | Tom | 280/467 |

Primary Examiner—Robert E. Pulfrey
Assistant Examiner—C. W. Hanor
Attorney—Floyd B. Harman

[57] ABSTRACT

A mechanism for mounting and selectively positioning a front mounted implement, such as a mower, on a vehicle, the mechanism having means for manually selecting a lateral disposition of the implement relative to the longitudinal axis of the carrier and also operative for automatically producing lateral displacements of the implement from the selected position in response to corresponding actuations of the carrier's steering apparatus wherein such actuations are determinative of the turning radius of the vehicle.

8 Claims, 5 Drawing Figures

INVENTOR
JAMES W. ZUREK

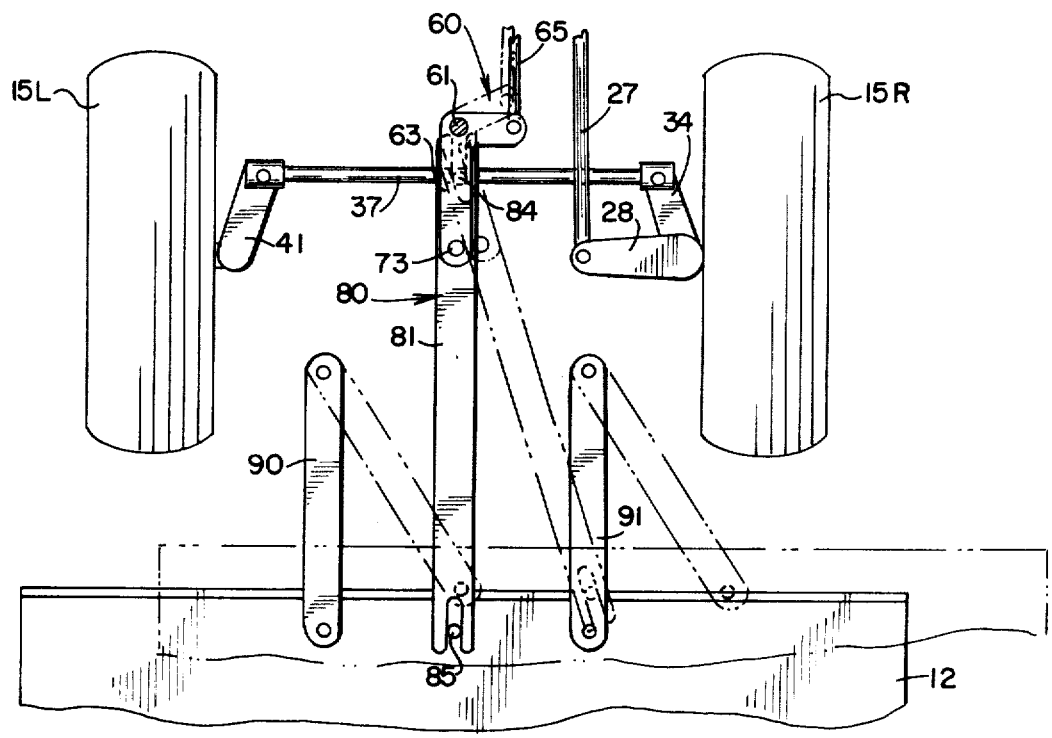
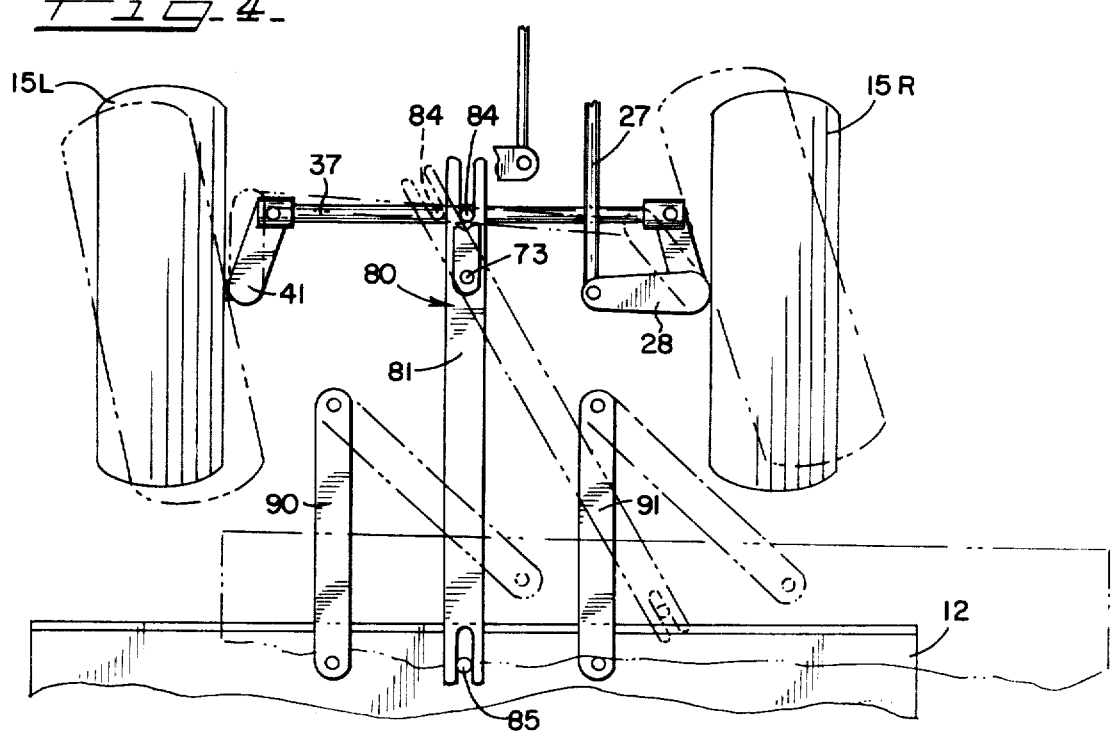

SIDE SHIFTING IMPLEMENT APPARATUS

BACKGROUND OF THE INVENTION

This disclosure is directed toward self-propelled vehicles of the three or four wheel type adaptable to have implements attached thereto for performing a variety of tasks about the house and farm; and is particularly involved in the problems inherent in the front mounting of implements of such vehicles.

In some cases the front mounting of implements is standard procedure because of the nature of the task performed. Snow blowing, or pushing material with a blade are obvious situations where front mounted implements are utilized. However, front mounted mowers on conventional garden tractors are not generally considered desirable because a mower of a practical width will cut a swath which falls outside the turning radius of the carrying vehicle. This is a considerable disadvantage which more than offsets an obvious advantage of a front mounted mower namely that it is constantly within the view of the operator. This feature in itself makes turning closely around obstacles considerably easier.

Another problem encountered with implement carriers of this type is the tendency to become unstable when operating on inclines or hillsides. The operator's weight can be a considerable percentage when compared with the overall weight of the carrier and implement. This results in a situation where the operator is positioned relatively high above the ground on the vehicle, thereby having the effect of repositioning the center of gravity of the carrier implement and operator combination higher above the ground. When operating on a level surface this is of little consequence since the center of gravity is usually aligned proximate the center longitudinal axis of the carrier. However, when operating transverse to the slope of a hill the center of gravity of the combination shifts away from the center longitudinal axis of the carrier in a direction downward of the combination resulting in instability thereof.

The applicant's invention is directed toward correcting the shortcomings heretofore found in the front mounting of implements.

A broad object of the invention is to provide a side shifting mounting apparatus for attaching an implement to the front of a vehicle-carrier for movement thereon.

A more specific object of the invention is to provide that the mounting apparatus be operative for positioning the implement at selected lateral positions relative to the longitudinal axis of the vehicle-carrier.

A still further object of the invention is to provide that the apparatus be responsive to the steering gear of the carrier to automatically shift the implement toward the center of the turning radius of the vehicle.

A still further object of the invention is to provide that the side shifting mounting apparatus have means to shift the implement laterally to a particular position on the front of the vehicle-carrier wherein the implement is further responsive to lateral shifting by the steering gear of the carrier.

BRIEF DESCRIPTION OF THE DRAWING

FIG. 3 is a partial diagrammatic plan view showing the action of the shifter lever in side shifting the mower on the vehicle in response to the steering gear;

FIG. 4 is a partial diagrammatic plan view showing the action of the bell crank mechanism in laterally orientating the mower on the vehicle;

DESCRIPTION OF THE PREFERRED EMBODIMENT

Figure 1:
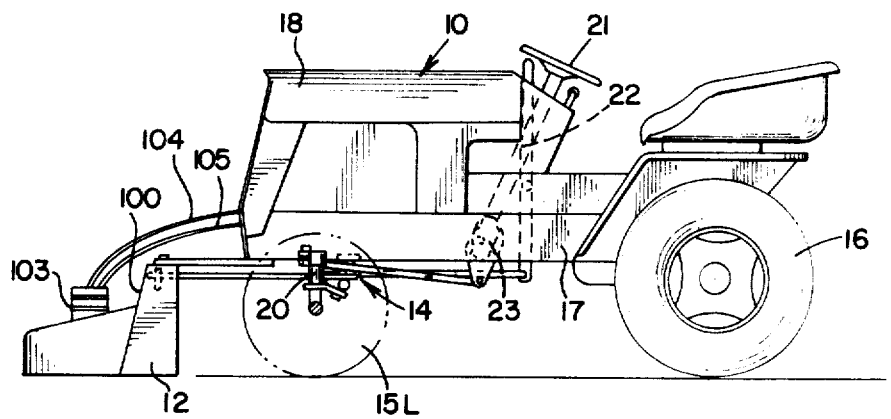
FIG. 1 is an elevational view of a vehicle-carrier having parts removed showing the side shifting apparatus with an implement mounted thereto.

Referring to FIG. 1, a garden tractor is indicated in its entirety at 10 and has attached thereto a front mounted implement 12 by means of the instant invention namely a side shifting mounting apparatus, designated 14. The implement 12 in this particular instance is shown as a mower, however it should be noted the inventive concept disclosed herein is not restricted in application to implements only designed for mowing operations; for it is contemplated that other implements such as snow blowers, front mounted blades and other attachments used on such tractors can utilize the novel features of the instant invention herein disclosed.

The tractor 10 is of the conventional type comprising pairs of front and rear ground engaging wheels designated 15L, 15R and 16 respectively. The wheels are mounted on a frame assembly 17 to which is connected a body 18. The front wheels 15L, 15R are actuated by a steering assembly 20 which is operative for steering the tractor.

The steering assembly comprises a steering wheel 21 connected to the upper portion of a steering column 22 mounted on the frame 17. A steering gear assembly 23 is connected to the lower portion of the steering column 22. The steering wheel 21 is operatively connected to the gear assembly 23 wherein turning the steering wheel actuates a cam (not shown) within the gear assembly. A cam follower 24 is mounted on a lever plate 25 and engages the cam which in turn drives the lever plate 25 to pivot about a retaining bolt 26. The retaining bolt also serves to hold the lever plate 25 and the associated cam follower 24 in position on gear assembly 23.

Figure 2:
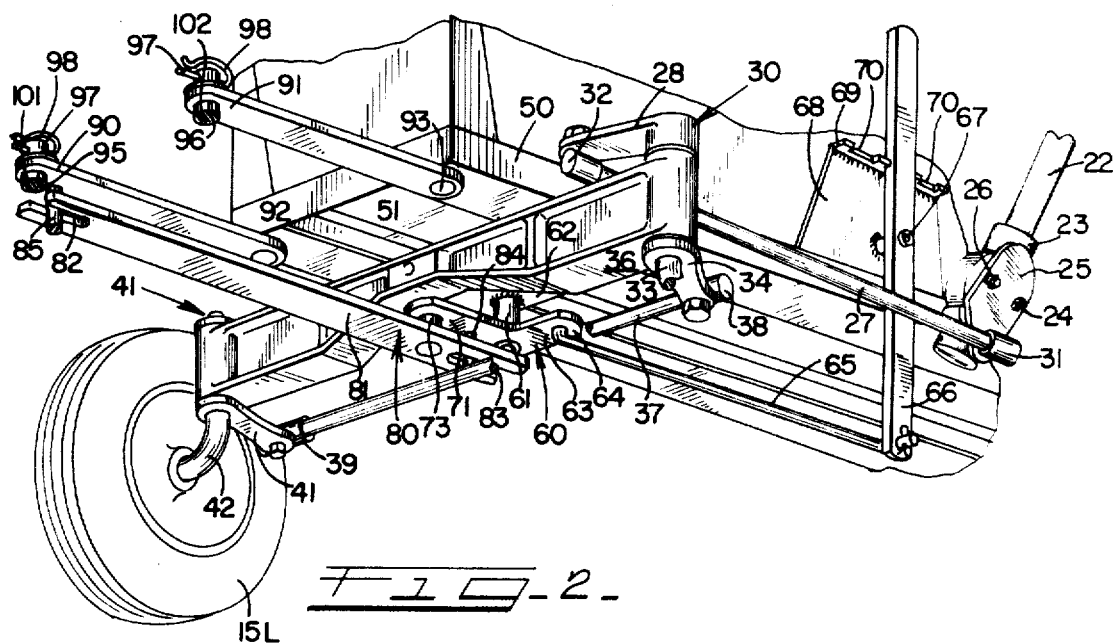
FIG. 2 is a fragmentary perspective view of the carrier with the mower body removed and showing the side shifting mounting apparatus connected thereon.

A steering gear drag link 27 is connected between the lever plate 25 and an arm 28 of a right hand knuckle steering assembly, generally designated 30, by means of joints 31 and 32 connected to the ends of the drag link 27 as shown in FIG. 2. The knuckle assembly 30 also comprises an axle 33 upon which right front wheel 15R (deleted for clarity) is journaled and includes a right lower lever arm 34 affixed to the axle 33. The axle 33 is journaled in a main axle frame 36. A tie rod 37 comprising tie rod end joints 38 and 39 is connected between the right lower lever arm 34 and a left lower lever arm 41 of a left hand knuckle steering assembly, designated 40. The left hand steering assembly comprises an axle 42 having affixed thereto the left lower lever arm 41. The left wheel 15L is journaled upon the axle 42.

The main axle frame 36 is connected to spaced longitudinal frame members 50 and 51 of the tractor's frame assembly 17.

The side shifting mounting apparatus 14 comprising a bell crank and lever mechanisms designated 60 and 80 respectively mounted on the tractor's frame assembly 17 and interconnected in a coacting relation to provide means to select a lateral orientation of the implement on the front of the vehicle whereby the implement can be shifted laterally from that selected orientation in response to movements in the steering assembly wherein such movements act to produce changes in the direction of travel of the vehicle.

Figure 5:
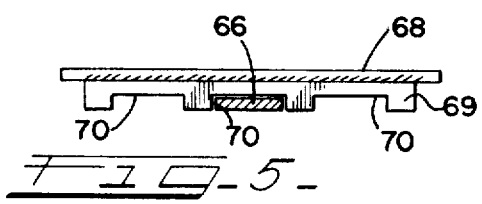
FIG. 5 is a fragmentary plan view of the bell crank handle and retaining member.

The bell crank mechanism 60 is rotatably mounted on a pivoting pin 61 securely affixed to a lateral frame member 62. The pin 61 extends downwardly from the frame member 62 wherein a bell crank 63 which serves as an auxiliary means, is rotatably mounted on the lower portion of the pin 61. A rod 65 is connected to one arm 64 of the bell rank and extends rearwardly where it is pivotally connected to an actuating lever arm or handle 66, said rod and handle constituting remote control means for the pivot assembly 60. The lever handle 66 extends upward and is pivotally connected midpoint it's ends on the tractor by a pin 67 secured to a plate 68 which is welded on the frame member 50. The handle is held in position by means of a dentil shaped member 69 which is secured to the plate 68 at a position above the pin 67. The member 69 has a series of notches 70, each operative to receive the lever handle 66 and thereby retain the handle in a selected position (see FIG. 5).

The other arm 71 of the bell crank 63 has another pin 73 which is securely affixed to the end thereof and extends downwardly therefrom. A shifter lever 81 is rotatably connected to the pin 73 at a point between it's ends as shown in FIG. 2. It can also be seen that the pin 73 has been positioned closer to the rearwardly disposed end of the shifter lever 81 whereby small lateral displacements of the rearward end will result in relatively large lateral displacements at the forward end of the lever 81. Slots 82 and 83 have been cut in the forward and rearward ends respectively of the shifter lever 81. The rearward end of the shifter lever 81 extends over the tie rod 37 in such a manner to dispose the slot 83 to engage a lug 84 fastened approximately on the middle of the tie rod 37. The lug 84 is positioned on the tie rod to extend upwardly and through the slot 83 and in the middle thereof when the mower is in a centered position to provide a sliding pivotal engagement of the lug 84 within the slot 83.

The implement 12 is also provided with a similar lug 85 which engages the slot 82 in a sliding pivot connection; in the forward end of the shifter lever 81 in substantially the same manner as the engagement of the slot 83 and lug 84 hereinbefore described.

The implement is swingably supported on the front of the vehicle by a pair of parallel support arms 90 and 91. One end of each arm is connected to the vehicle frame and disposed in substantially equal spaced relation from each other about the center of the tractor. Arms 90 and 91 are connected to frame members 51 and 50 respectively and arranged to pivot thereon by pivot lugs 92 and 93 which are securely fastened to the frame, thus leaving the other ends of the arms free to be attached to an implement. When an implement is pivotally attached to the arms 90, 91, it will constrain to swing laterally from the center of the tractor to each side in an arc determined by the length of the arms 90, 91.

The mower shown has a structural body 100 to which the free ends of the arms 90, 91 are each pivotally attached to protruding lugs 101 and 102. The lugs 101 and 102 are welded to the body 100 of the mower and disposed thereon in aligned spaced relation substantially the same as that of the pins 92 and 93 which pivotally secures the supporting arms (90, 91) to the frame 17. It is illustrated in FIGS. 3 and 4 that this disposition of the supporting arms 90 and 91 produces a simple parallelogram arrangement for laterally shifting the mower relative to the vehicle. The lugs 101, 102 are passed through holes 95 and 96 in the arms 90, 91 respectively. A washer 97 and a retaining pin 98 are used to secure the mower on the arms as shown in FIG. 2.

The mower is powered by a hydraulic motor 103 which is operatively connected by an appropriate drive mechanism to an arrangement of mowing blades (not shown). Hydraulic hoses 104 and 105 provide a flexible hydraulic fluid supply and return system for conducting the necessary fluid power to motor 103 for mowing operations. The hydraulic power source has not been shown, but is understood to be incorporated into the vehicle and that the hoses have been operatively connected thereto.

FIG. 3 shows the mower 12 oriented in a central position on the vehicle and illustrates the operation of the shifter lever mechanism 80 in shifting the mower in response to steering changes. When the operator turns the steering wheel 21 the gear assembly 23 is actuated and drives the lever plate 25 about retaining bolt 26. For purposes of illustration the tractor 10 is shown being turned toward the right. It is to be understood that in both FIGS. 3 and 4 the operation of the side shifting mounting apparatus is identical for either right or left turns. When the steering assembly turns the vehicle toward the right, the arm 28 of the right handknuckle assembly 30 is pivoted forwardly, whereby the lower right lever arm 34 pivots inwardly toward the vehicle's center. The tie rod 37 connected to the lower right arm 34 is thereby caused to move laterally of the vehicle in response to such a steering change. The upwardly extending lug 84 on the tie rod 37 extends through the slot 83 and is therefore in engaging disposition with the rearward end of shifter lever 81 and effective to urge that lever to pivot correspondingly about its pivot pin 73. It can be seen that when this occurs the forward end of the shifter lever 81 moves laterally of the vehicle, as shown. Since the protruding lug 85 of the implement is slidably engaged in the slot 82 of the shifter lever 81 and the implement is swingably carried on the arms 90, 91, it follows that the implement will be responsively shifted to a lateral position which corresponds to the actuation of the tractor's steering gear and therefore to a particular turning radius determined by the steering assembly itself. It can be appreciated that with such a mechanism that the pivot pin 73 of the shifter lever 81 can be located on the shifter lever 81 relative to the ends thereof to provide lateral movements of a front mounted implement wherein the implement will have a predetermined optimum positional relationship to any selected turning radius of the vehicle. In a mower application, one of the optimum relationships to be considered would be that the swathe cut by the mower would at all times fall within the turning radius of the vehicle. With a stationary mounted mower this result is only possible if the mower extends substantially beyond the lateral dimensions of the vehicle which is obviously impractical.

Referring to FIG. 4, there is illustrated the function of bell crank mechanism 60 which is operative for selectively orientating the mower at selected lateral positions on the front of the vehicle. When a lateral orientation from the center is desired the lever handle 66 is urged outwardly from its central notch. The handle 66 is then moved either fore or aft depending upon the lateral position desired. FIG. 4 contemplates that the handle 66 is moved to the rearward slot 70 and retained therein for purposes of illustration. When the handle is so moved the rod 65 moves rearwardly causing the bell crank 63 to rotate about its pivot pin 61. As this occurs the arm 71 upon which the pivot pin 73 of the shifter lever 81 is secured moves to a position laterally displaced from its previous location. It can be seen that the point or axis about which the shifter lever pivots has been laterally displaced without a corresponding relative displacement of the lug 84 on the tie rod 37. This causes the shifter lever 81 to pivot about the pin 73 thereby swinging the mower on the arms and shifting it laterally to the right and a new orientation on the front of the vehicle. It should be noted that at this new position the shifter lever 81 is still in active engagement with the tie rod 37 of the steering assembly 20 and will respond to movement therein as heretofore described. This feature of shifting the mower to selected lateral positions has the effect of also shifting the center of gravity of a mower-vehicle combination laterally in the direction the mower is shifted. In some applications such a shifting of the center of gravity would produce a greater stability and the danger of tipping would be lessened. This is particularly the case when the combination is used transversely on inclines.

It will be appreciated that the embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood, that the particular structure and functional aspect emphasized herein are not intended to exclude but rather to suggest such other modifications and adaptations as fall within the spirit and scope of the invention as defined in the appended claims.

What is claimed is:

1. An implement mounting upon and disposed at the front of a vehicle having a front steering assembly comprising wheels and interconnecting tie-rod means for angling the wheels; link means mounted on the vehicle for swinging movement of the implement laterally of the vehicle; means for connecting said implement with said link means to accommodate movement of said implement laterally with respect to said vehicle; and side shifting means movably mounted on the vehicle and having a slidable pivotal connection with said implement and said tie-rod means for responsive movement of the implement with the wheels to position the implement in the direction of travel of the vehicle.

2. The invention according to claim 1 wherein said side shifting means comprises an elongated member having a pivotal connection intermediate its ends to said vehicle for pivoting movement thereon and adapted to translate said movements thereof about said pivotal connection into corresponding lateral movements of said implement.

3. The invention according to claim 2 and said link means comprising a pair of parallel arms mounted in spaced relation on said vehicle and said implement on vertical axes to permit lateral movement of the implement in a substantially horizontal plane.

4. The invention according to claim 1 and means for selectively orienting said implement laterally on said vehicle in a plurality of positions independently of the tie-rod means.

5. The invention according to claim 4 wherein said shifting means comprises an elongated member having a connection intermediate it's ends to said implement orienting means for pivoting movement thereon, said implement orienting means comprising a shiftable pivot mechanism on said vehicle and means for selectively shifting said mechanism to selected positions.

6. A linkage for mounting an implement from the front of a vehicle having a steering assembly with turning wheels, comprising:

laterally swingable means for swingably mounting said implement on said vehicle to accommodate lateral movement of said implement thereon, shifter means for operatively coupling said steering assembly to said implement comprising a displaceable pivot assembly for mounting on the vehicle, link means pivotally mounted intermediate its ends on the pivot assembly, said link means having its ends operatively coupled to the steering assembly and implement, respectively, said link means laterally shifting said implement in response to an actuation of said steering assembly angling said wheels to maintain a predetermined positional relationship of said implement in accordance with turning of said vehicle, and auxiliary means for mounting on the vehicle for selectively displacing said pivot assembly to laterally shift the pivot axis of the link means relative to said steering assembly to effect corresponding lateral shifting of the implement on said vehicle.

7. The invention according to claim 6 and means for remotely controlling said auxiliary means.

8. The invention according to claim 6 and wherein said pivot assembly comprises a bell crank.

* * * * *